June 10, 1924.
W. J. SHACKELTON
PORTABLE IMPEDANCE BRIDGE
Filed Jan. 29, 1921
1,496,786
Fig. 1.
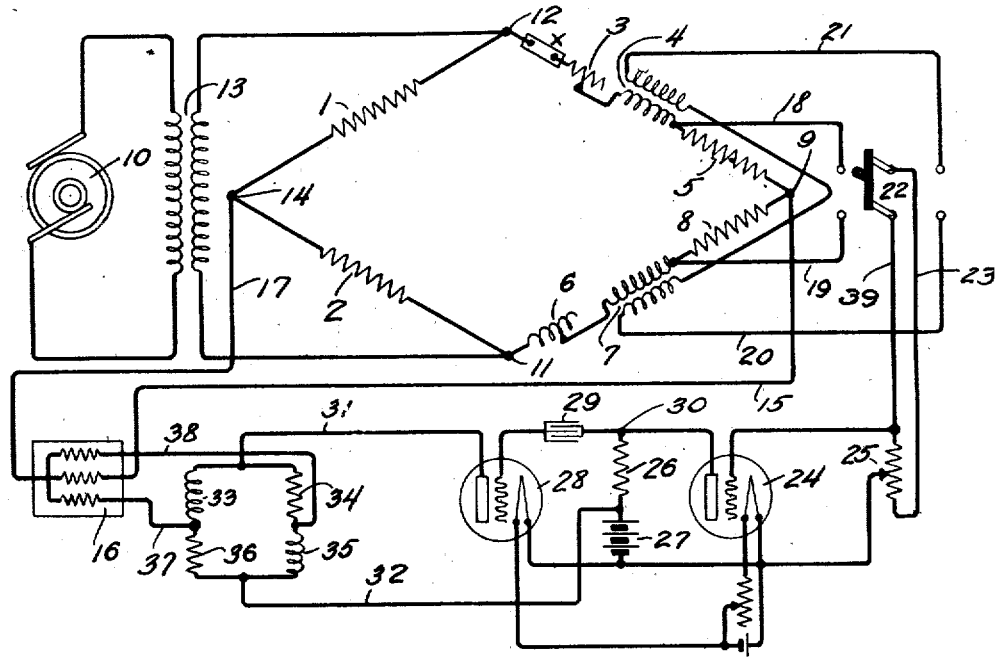
Fig. 2.
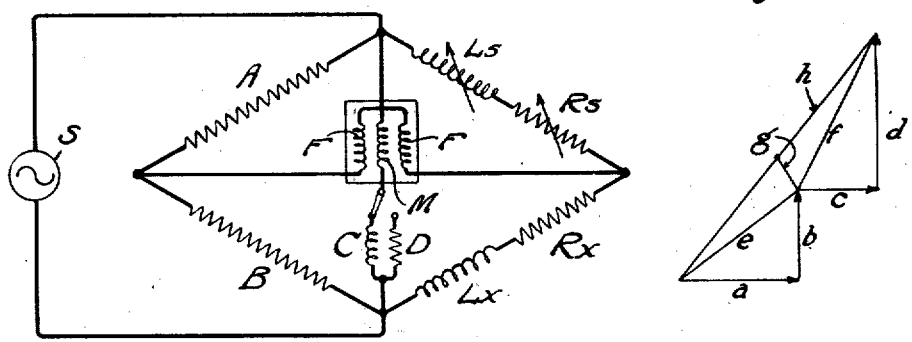
Fig. 3.
Fig. 4.
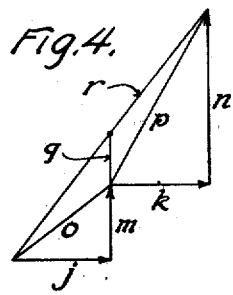
Inventor:
William J. Shackelton
by Joel C. R. Loemus
Atty.

Patented June 10, 1924.

1,496,786

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

PORTABLE IMPEDANCE BRIDGE.

Application filed January 29, 1921. Serial No. 440,865.

*To all whom it may concern:*

Be it known that I, WILLIAM J. SHACKELTON, a citizen of the United States of America, residing at Scotch Plains, in the county of Union, State of New Jersey, have invented certain new and useful Improvements in Portable Impedance Bridges, of which the following is a full, clear, concise, and exact description.

This invention relates in general to electrical testing systems and more particularly to systems for the determination and measurement of the electrical characteristics of circuits and apparatus.

The object of the invention is to provide a simple and accurate system for determining separately and independently the reactance and resistance components of an impedance.

Systems somewhat similar to this in general principle of operation have been devised and are not uncommon. They employ a Wheatstone bridge arrangement of known and unknown elements, and a galvanometer detector having a fixed coil and a moving coil. The moving coil is adapted to be energized by the unbalance current of the bridge while the fixed coil is energized alternately by current in phase or in quadrature with the source of alternating current used to energize the system. Ordinarily this is done by bridging the fixed coil across the current source leads through a switch which is adapted to include in the circuit either a resistance or an inductance element. With such an arrangement it is necessary to make a large number of trial balances before an approximately true balance is obtained. Each successive attempt makes a closer approximation although, for reasons which will hereinafter be more thoroughly discussed, an absolute balance is theoretically impossible by this cut and try method.

This invention overcomes this difficulty by exciting the fixed coil of the galvanometer with current derived directly from the current flowing in the bridge. Current in phase is obtained from a shunt about a symmetrical arrangement of resistances located in the unknown and variable arms of the bridge. Current in quadrature is obtained from the secondaries of transformers whose primaries are positioned in a manner similar to the resistance elements. These currents may be very small and in this case are amplified without phase distortion until of sufficient magnitude to properly excite the galvanometer coil. In this way it is possible to immediately balance first one component and then the other. Neither balance is in any sense a trial balance but a final determination needing no subsequent revision.

Other objects and advantages will appear from the further and detailed description of the preferred form of the invention as illustrated diagrammatically in the drawing.

Referring to the drawing Fig. 1 shows diagrammatically the system which comprises a Wheatstone bridge including unknown elements with which adjustable elements are adapted to be balanced; a source of alternating current to be impressed on the system; a galvanometer having two actuating windings, one of which is adapted to be excited by the unbalance current of the bridge, the other of which is adapted to be excited by currents derived from that flowing through the bridge; and means to amplify these derived currents without phase distortion; Fig. 2 shows the diagram of the arrangement ordinarily employed heretofore; Fig. 3 is a vector diagram of the conditions obtaining when the system of Fig. 2 is used. Fig. 4 is a vector diagram showing conditions obtaining when the system of Fig. 1 is employed.

The Wheatstone bridge is composed of two ratio arms, 1 and 2 having equal resistance elements included in each. The arm of the bridge including the unknown element, comprises a variable resistance element 3, the primary of induction coil 4, a known resistance element 5 and an element of unknown impedance X. The arm which is adapted to balance the unknown element includes a variable inductance 6, the primary of transformer 7, and known resistance element 8. The resistance elements 5 and 8 are entirely similar and are symmetrically placed about the point 9. The transformers 4 and 7 are designed with equal characteristics and are also located with other respective elements, symmetrically about point 9. The source of alternating current 10, supplies current to the bridge at points 11 and 12 in the usual manner through a transformer 13.

Until a balance is obtained in the bridge between the adjustable and the unknown elements, current will flow across the points 9 and 14 through the lead 15, the moving coil of the galvanometer 16, and lead 17, or vice-versa, depending upon the direction of the unbalance potential.

In order to excite the fixed coil of the galvanometer 16, potential is tapped off from the bridge about the resistances 5 and 8 by means of the leads 18 and 19. The potential induced in secondaries of the transformers 4 and 7 is also adapted to be used for exciting the fixed coil of the galvanometer 16, by means of the leads 20 and 21 connecting the transformer secondaries in series. It is self-evident that potential tapped off about the resistances 5 and 8 will be in phase with current passing through the unknown element X. When such potential is used to energize the detector galvanometer, the field can, by suitable well known ways, be made to be exactly in phase with this current.

The potentials used to excite the fixed coil of the galvanometer 16 are apt to be very small when obtained in the manner above described. For this reason they are preferably amplified and for this purpose the inventor has devised a system of amplification which amplifies these currents without distortion of their phase relation. The switch 22 which is adapted to transfer the leads 39 and 23 from connection with the leads 20 and 21, to the leads 19 and 18, is connected to the grid circuit of thermionic amplifier 24. The potentiometer device 25 is interposed to regulate the amount of current which will flow in this circuit. The plate circuit of amplifier 24 includes a high resistance element 26 and a source of direct current 27 supplying space current. The grid of amplifier 28 is charged in accordance with the output current of amplifier 24, through the condenser 29, which is connected at the point 30 in the plate circuit of the first amplifier 24. The source 27 also supplies current to the plate circuit of the amplifier 28. The current in the plate circuit of amplifier 28 is composed of two components; one a direct current and the other alternating. It is obvious that in order to properly excite the fixed coil of galvanometer 16, these components must be in some manner separated so that only the alternating component will excite the winding. For this purpose the leads 31 and 32 of the plate circuit of amplifier 28 are connected in a quadrilateral arrangement of alternate resistance and inductance elements, all of which have the same DC resistance. The lead 31 is connected between the inductance element 33 and the resistance element 34 and the lead 32 is connected between the inductance element 35 and the resistance element 36. Lead 37 connected with the fixed coil of the galvanometer 16 is connected between the inductance 33 and the resistance 36, similarly lead 38 is connected between the inductance 35 and the resistance 34.

The advantage of the circuit arrangement as described above will appear from a discussion of the circuit of Fig. 2 in which "A" and "B" are equal non-inductive resistance ratio-arms, "$L_s$" and "$R_s$" represent respectively adjustable standard inductance and resistance, "$Lx$" and "$Rx$" represent the corresponding characteristics of the unknown impedance being measured, "F, F" are the fixed coils and M the moving coil of the detecting dynamometer (these may be reversed in position), "C" and "D" are reactance and resistance elements, respectively, which are alternately connected in series with "M" when obtaining a balance. A suitable source of alternating current "S" is connected in the usual manner to energize the bridge.

The vector diagram showing the potential distribution of the circuit, when the condition of balance is approximated, may for example be as shown in Fig. 3 in which the vectors "$a$" and "$b$" represent the resistance and reactance potentials, respectively, of the arms "$L_s R_s$"; "$c$" and "$d$" similarly represent the corresponding vectors for "$Lx$" and "$Rx$"; "$e$" and "$f$" then are the vector sums of these potentials and "$h$" the total potential of the bridge circuit. This potential "$h$" is obviously then also the potential of the two arms "A" and "B" and its midpoint represents the potential of the junction of "A" and "B." Hence, the potential acting on the detecting coils "FF" is represented by the vector "$g$" joining the midpoint of "$h$" with the junction of "$e$" and "$f$." It is evident that if, when the coil "M" is connected to "D," the resulting energizing flux of the detector is exactly in phase with the bridge E. M. F., it may be represented by a vector parallel to the vector "$h$." The deflection then resulting from the current due to the potential "$g$" (assuming this current to be in phase with the potential "$g$" which it can be made to be) is zero when, by suitable adjustments of "$L_s$" and "$R_s$," the vector "$g$" is caused either to vanish or to become perpendicular to the vector "$h$." From the consideration of Fig. 3, it is evident that the condition of perpendicularity obtains when the vectors "$e$" and "$f$" are equal. Since "$e$" is the resultant of "$a$" and "$b$," it can be made equal to "$f$" by an infinite number of combinations of "$a$" and "$b$," that is for every value of "$a$" (less than "$e$"), a value of "$b$" can be found which will cause "$e$" to equal "$f$" and hence result in an apparent balance of the bridge. On account of this it will almost invariably happen that in practice such a false balance will be obtained rather than the true one, that is, the one in which "$g$" vanishes. Furthermore, the settings of "$L_s$" and "$R_s$" may and frequently are initially quite different from the values of "$L_x$" and "$R_x$." In order therefore to proceed with the measurement it is necessary to set up a second condition which will determine whether the balance is due to "$g$" having become zero or only to its being perpendicular to "$h$" and which will also guide the operator to a closer approximation of "$L_s$" and "$R_s$" to "$L_x$" and "$R_x$" respectively. This has hitherto been done by shifting the phase of the energizing field of the detector as for example by inserting the inductance "C" so that it is approximately in quadrature with the bridge E. M. F. When this has been done, it is evident that, if the vector "$g$" is perpendicular to "$h$" it is now approximately parallel to the vector of the energizing field and a deflection will therefore result. Standards "$Ls$" and "$Rs$" may now be readjusted until the deflection is again zero which will occur as before when "$g$" is either zero or now approximately parallel to "$h$." In general this second adjustment will result in a closer approximation of the true condition of condition of balance. Reverting to the first connection, a third approximation may be obtained and so on until when the energizing field is either in phase or in quadrature with the bridge E. M. F., the detector deflection is sensibly zero when it may be considered that the true balance point has been obtained.

It should be evident from the preceding discussion that at no time in the course of a given test, except when the final balance has been obtained is the value of either the reactance or resistance components of the impedance under test known and that in arriving at the final balance point a long and tedious series of approximate balances must be made. This is not the case in using the circuit of this invention. By energizing the detector galvanometer either with current flowing in the known and unknown arms or with a current derived from the bridge currents so as to be alternately in phase or in quadrature with it, accurate balances may be directly obtained of either component independently.

Referring to Fig. 4, which shows the vector diagram obtaining when the circuit is employed in accordance with this invention, vectors "$j$" and "$k$" corresponding to the resistances of arms 11—9 and 9—12, respectively of Fig. 1 are drawn equal. It is evident from geometrical consideration that the unbalance vector "$q$" is now perpendicular to the vectors "$j$" and "$k$". Since these vectors represent the phase of the currents in the known and unknown arms respectively, it is clear that when the detector is excited in phase with these currents, there will be no deflection due to the unbalance potential "$q$" present when the resistance components of the two bridge arms are balanced. Consequently to balance such resistance components, it is only necessary to have the detector energized in phase with the current in the known and unknown arms. It is assumed in the foregoing that the current taken by the detector from the bridge balance points is unappreciable in comparison with the main bridge current. To accomplish this is a question of sensitivity of detector or when very small bridge currents are to be used, a vacuum tube detector may be used.

Having thus balanced for the resistance component, it is an easy matter to balance the reactance components. As above described this is done by energizing the galvanometer from the potentials induced in the secondaries of the transformers "4" and "7". The reactance vectors "$m$" and "$n$" are equalized without alteration of vectors "$j$" and "$k$" making the impedance vectors "$o$" and "$p$" of the known and unknown arms, respectively, coincide with the total impedance vector "$r$" and the vector "$q$" vanishes.

It can be shown in the manner followed above that when the detector field is in quadrature with the bridge arm current, zero deflection is obtained when the reactances are balanced, although the resistances may be unbalanced.

The system as described above may be modified so as to eliminate the switch 22 by using two galvanometers, the fixed coil of one galvanometer being connected with the leads 18 and 19 and the fixed coil of the other with the leads 21 and 20 so that no switching operation will be necessary. In practical use, however, this is considered unnecessary and does not add to the efficiency of the system.

What is claimed is:

1. In a system for measuring the resistance and reactance components of an electrical impedance, a source of alternating current; a Wheatstone bridge associated therewith; a galvanometer having a pair of actuating windings, one of which is adapted to be excited by the unbalance current of the bridge; a symmetrical arrangement of resistance elements in the unknown and the variable arms of the bridge; a shunt circuit associated therewith; a symmetrical arrangement of transformers in the unknown and the variable arms of the bridge; a secondary circuit associated therewith; and switching means to selectively associate the second actuating galvanometer winding with said shunt circuit and said secondary circuit.

2. In a system for measuring the resistance and reactance components of an electrical impedance, a source of alternating current; a Wheatstone bridge associated therewith; a galvanometer having a pair of actuating windings, one of which is adapted to be excited by the unbalance current of the bridge; a resistance symmetrically positioned in the unknown and variable arms of the bridge; a shunt circuit about said resistance; means for inducing current in quadrature with the current flowing through the unknown element to be measured; a secondary circuit for said means; and means to associate the second actuating winding of the galvanometer with said shunt circuit or said secondary circuit.

3. In an electrical bridge; a source of alternating current; a galvanometer having two actuating windings, one of which is excited by the unbalanced current of the bridge; and means to selectively excite the other of said actuating windings with a current in phase with the current flowing through the unknown element of the bridge and with a current in quadrature therewith.

4. In an electrical bridge; a source of alternating current; a galvanometer having two actuating windings, one of which is excited by the unbalanced current of the bridge; a thermionic amplifier having an input electrode, and an output circuit associated with the other of said galvanometer actuating windings; and means for selectively energizing said input electrode with a voltage in phase with and corresponding to the current flowing in the unknown element of the bridge and with a voltage in quadrature therewith.

5. In an electrical bridge; a source of alternating current; a current detecting device having two mutually reactive actuating windings, one of which windings is excited by the unbalanced currents of the bridge; and means for exciting the second of said actuating windings with a current in phase with the current flowing through the unknown element of the bridge.

6. In an electrical bridge; a source of alternating current; a current detecting device having two mutually reactive actuating windings, one of said windings being excited by the unbalanced current of the bridge; and means for exciting the other of said actuating windings with a current in quadrature with the current flowing through the unknown element of the bridge.

In witness whereof, I hereunto subscribe my name this 26th day of January, A. D. 1921.

WILLIAM J. SHACKELTON.